Oct. 23, 1945.  A. G. GROSS  2,387,657
REFRIGERATION
Filed Aug. 2, 1943  2 Sheets-Sheet 1

INVENTOR
Alfred G. Gross
BY Harry S. Dumarse
ATTORNEY

Oct. 23, 1945. A. G. GROSS 2,387,657
REFRIGERATION
Filed Aug. 2, 1943 2 Sheets-Sheet 2

INVENTOR
Alfred G. Gross
BY Harry S. Dumarse
ATTORNEY

Patented Oct. 23, 1945

2,387,657

UNITED STATES PATENT OFFICE 2,387,657

REFRIGERATION

Alfred G. Gross, Wilmette, Ill., assignor to The Hoover Company, North Canton, Ohio, a corporation of Ohio Application August 2, 1943, Serial No. 496,992

19 Claims. (Cl. 62—5)

This invention relates to refrigeration and more particularly to a three-fluid absorption refrigerating apparatus utilizing a single power means for circulating all the mediums within the apparatus with a secondary heat transfer circuit for the transfer of heat from the space to be cooled to the evaporator of the refrigerating apparatus in which the secondary heat transfer fluid is also circulated by the power means and in which the secondary heat transfer circuit is in open communication with the absorption refrigerating apparatus but in which the heat transfer fluid is prevented from mingling with the refrigerant or the absorbent of the refrigerating apparatus. The entire apparatus including the heat transfer circuit is hermetically sealed and power is transmitted through the walls of the apparatus by a magnetic transmission.

More specifically, a fan is located in the inert gas circuit of the refrigerating apparatus to circulate the inert gas and is driven by a motor, located on the exterior of the inert gas circuit, by means of a magnetic transmission. The inert gas at its raised pressure sweeps the liquid refrigerant through the evaporator of the refrigerating apparatus and a portion thereof is utilized to operate a gas lift pump to circulate the absorption solution between the boiler and the absorber. The evaporating refrigerant in the evaporator is in heat transfer relationship with a liquid heat transfer medium which is inert with respect to the refrigerant and the absorption solution and still another portion of the inert gas placed under pressure in the inert gas circuit is utilized to operate a second gas lift pump to lift the cooled liquid medium to a cooling unit located in the food storage compartment of a domestic refrigerator from where this liquid returns by gravity again into heat exchange with the evaporator of the refrigerating apparatus. The inert gas utilized to circulate the auxiliary heat exchange liquid is separated therefrom in the cooling unit and is returned to the suction side of the circulating fan of the refrigerating apparatus.

The entire refrigerating apparatus including the evaporator is located in the apparatus compartment of a domestic refrigerator cabinet beneath the food storage compartment. The air cooled condenser and absorber of the refrigerating apparatus are mounted in a vertical position adjacent a wall of the apparatus compartment having louvers for the escape of cooling air and a fan, driven by the same motor which drives the inert gas fan, circulates air over the condenser and absorber to cool the same.

The energy supplied to the motor and the gas supplied to the burner for heating the boiler are controlled responsive to the temperature of the cooling unit or the food storage compartment, the arrangement being such that the control can be positioned in the apparatus compartment adjacent to the burner for the boiler.

Other objects and advantages of this invention will become apparent when taken in connection with the accompanying drawings, in which.

Figure 1:
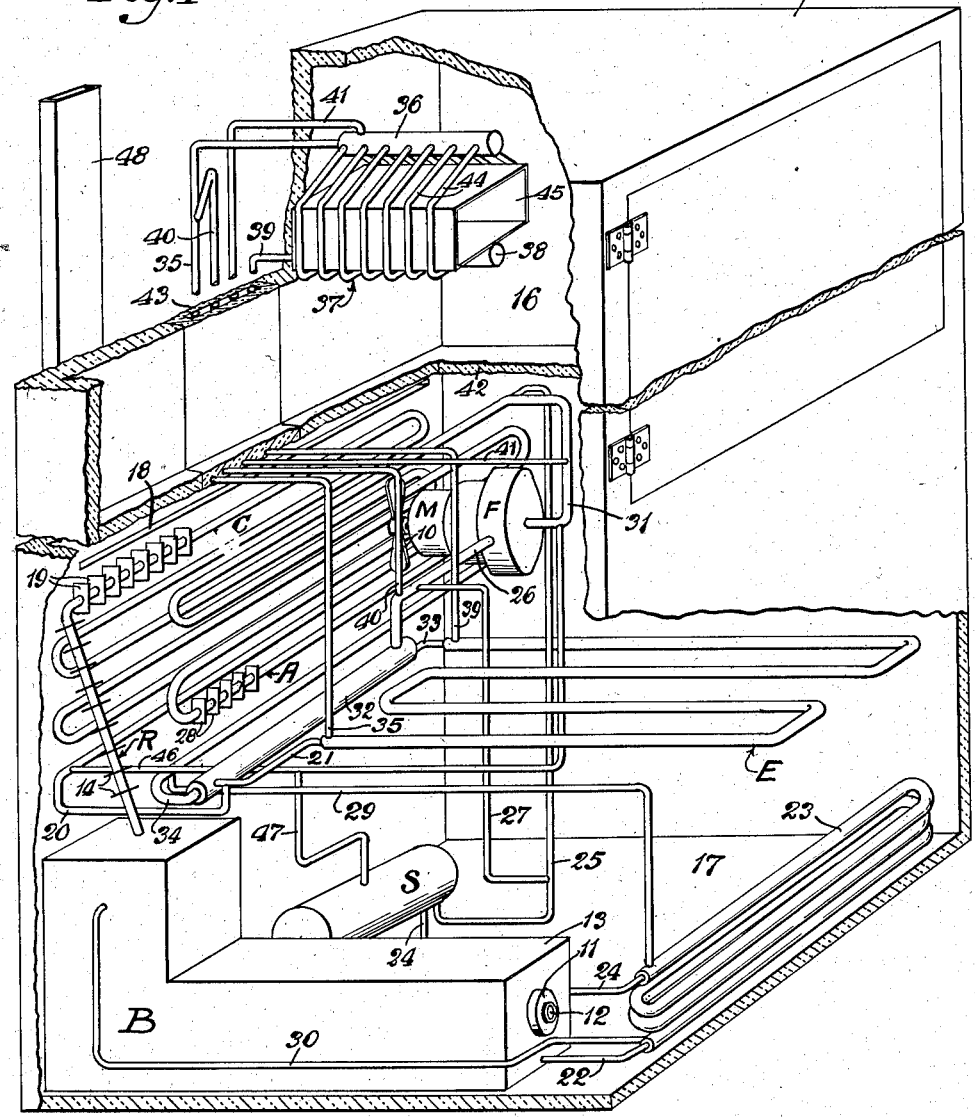
Figure 1 shows the refrigerating apparatus of this invention assembled with a domestic refrigerator cabinet partly broken away to depict the location of the various parts of the apparatus.

Referring to Figure 1 of the drawings, the apparatus comprises a boiler-analyzer assembly B, a rectifier R, a condenser C, an evaporator E, an absorber A, a reservoir S, and an electric motor M for driving a medium circulator fan F and an air circulating fan 10. The above-enumerated elements are connected by various conduits to form a complete refrigerating system which will be fore fully described hereinafter.

The system may be charged with a suitable refrigerant such as ammonia, a suitable absorption solution or liquid such as water, and a suitable inert gas or pressure equalizing medium such as hydrogen or nitrogen.

The boiler-analyzer assembly B comprises a horizontal cylindrical vessel 11, with a cylindrical tube for flue gases 12, both of which are seen extending from the insulation 13 at the right hand end of the assembly. At the opposite end of the assembly is a vertically extending standpipe which constitutes an analyzer, which is not shown in the drawings, being embedded in the insulation 13.

The application of heat to the boiler-analyzer assembly liberates ammonia vapor from the strong absorption solution which is present therein and this ammonia vapor rises upwardly through the standpipe, constituting the analyzer, in counterflow with strong absorption solution returning to the boiler analyzer assembly whereby further refrigerant vapor is liberated by the heat of condensation of the absorption solution vapor which is invariably driven off with the ammonia vapor.

The ammonia vapor driven off in the boiler-analyzer assembly B, containing some absorption solution vapor, flows upwardly through the air cooled rectifier R where the heat of condensation of the absorption solution vapor is liberated to the cooling air flowing over the rectifier by air cooling fins 14 which are mounted on the exterior walls of the rectifier R. This causes the absorption solution vapor to condense and the condensed vapor flows backwardly through the rectifier tube R into the boiler-analyzer assembly.

From the rectifier R the dehydrated ammonia vapor enters the top of the condenser C and flows downwardly therethrough. The condenser C is positioned adjacent the rear wall of a domestic refrigerator cabinet which is generally indicated at 15 and has a food storage compartment 16 and an apparatus compartment 17 in which the condenser C is located. The rear wall of the apparatus compartment has louvers 18 formed therein for the exit of cooling air.

The heat of condensation of the ammonia vapor flowing downwardly through the condenser C is transferred to the cooling air by means of heat exchange fins 19 mounted on the exterior of the condenser tube which causes the ammonia vapor to condense and flow downwardly through the condenser C due to the fact that the tubes of the condenser have a continuous downward slope throughout. The condensed refrigerant condensed in the condenser C enters the evaporator E by conduits 20 and 21. It is to be noted that the conduit 20 is in the form of a downwardly extending loop so as to form a liquid trap between the condenser C and the evaporator E.

The weakened absorption solution formed in the boiler-analyzer assembly B, by the application of heat, leaves by the conduit 22, enters the central tube of the concentric tube heat exchanger 23 and flows by conduit 24 into the solution reservoir S. The level of liquid in the solution reservoir S is the same as that in the boiler-analyzer assembly B which level is below the top of the absorber A.

In order to lift the solution from the level existing in the solution reservoir S, a gas lift conduit 25 of small diameter is provided leading to the top coil of the absorber A, as shown at the right hand end of Figure 1. The gas lift pump 25 receives pumping gas from the medium circulating fan F by means of the discharge conduit 26 and the connecting conduit 27 which is connected to the gas lift pipe 25 at a level below the level existing in the solution reservoir S. The solution level in the solution reservoir S maintains the proper depth of immersion on the gas lift pump so that gas entering the conduit 25 through the conduit 27 will form alternate slugs of gas and liquid whereby the weakened absorption solution will be raised to the top of the absorber A.

The absorber A is also positioned in a vertical position in the back of the apparatus compartment 17 slightly in front of the condenser C and has a continuous downward slope throughout so that the absorption solution can flow downwardly therethrough by gravity. The absorption solution which enters the top of the absorber flows downwardly therethrough in counterflow to a mixture of inert gas and refrigerant vapor from the evaporator whereby the refrigerant vapor content of the mixture is absorbed in the weakened solution and the heat of absorption is transferred to the cooling air by air cooling fins 28 mounted on the absorber tubes.

The absorption of the refrigerant vapor by the weak absorption solution in the absorber forms a strong solution which leaves the bottom tube of the absorber A by conduit 29 which leads to the outer passageway of the concentric tube heat exchanger 23. The strong absorption solution flowing through the outer passageway of the concentric tube heat exchanger 23 takes up heat from the strong absorption solution from the boiler flowing through the inner tube of the concentric tube heat exchanger 23 whereby the strong solution is materially heated and flows by the conduit 30 to the top of the analyzer column where it flows downwardly therethrough in counterflow to rising vapors generated in the boiler-analyzer assembly B. The strong solution is further heated by the rising vapors and as previously pointed out by the heat of condensation of the absorption solution vapor and some refrigerant vapor is driven therefrom before it comes into direct heat exchange with the heat being supplied to the boiler-analyzer assembly B.

The inert gas which was stripped of the ammonia vapor in the absorber A is taken therefrom by the suction conduit 31 of the circulating fan F and is placed under a pressure of approximately four inches of water. The inert gas placed under pressure by the circulating fan F leaves the fan by the discharge conduit 26, flows through the outer passageway of the concentric tube gas heat exchanger 32 and enters the evaporator E by conduit 21 simultaneously with the liquid refrigerant condensed in the condenser C.

The evaporator E comprises essentially a concentric tube heat exchanger although it may take other forms. The liquid refrigerant and the inert gas flows through the inner passageway of the concentric tube heat exchanger evaporator E whereby the liquid refrigerant evaporates by diffusion into the inert gas to produce a refrigerating effect. The inner tube of the concentric tube evaporator E is small in diameter and the inert gas placed under pressure by the circulating fan F flows therethrough at a relatively high velocity so that it propels the liquid refrigerant along the inner tube of the concentric tube evaporator by the frictional or dragging action of the inert gas flowing over the surface of the liquid refrigerant while it is evaporating into the inert gas.

The outer passage of the concentric tube evaporator E contains a secondary heat transfer liquid which is inert to both the ammonia and the absorption solution and which will not freeze at any temperature at which the evaporator may operate. This fluid may be a fluid such as ethylamine or it may be a weak solution of ammonia and water, the concentration being such that the liquid will not freeze at any temperature to which the evaporator may be reduced. The outer passageway of the concentric tube evaporator E forms a portion of a heat transfer circuit which will be described in more detail hereinafter.

The evaporation of refrigerant into the inert gas in the evaporator E forms a rich mixture of inert gas and ammonia vapor which leaves the evaporator by conduit 33, flows through the inner passageway of the concentric tube heat exchanger 32 and enters the bottom tube of the absorber A through a horizontal U-bend 34. Any absorption solution vapor which may enter the condenser in spite of the analyzer and rectifier R will be condensed and carried along with the inert gas mixture through the conduit 33, the inner passage of the concentric tube gas heat exchanger 32, the horizontal U-bend 34 and drain from the bottom tube of the absorber A through the conduit 29 along with the absorption solution.

The mixture of inert gas and refrigerant vapor which enters the bottom tube of the absorber A flows upwardly therethrough in counterflow to the weak absorption solution flowing downwardly therethrough and the refrigerant vapor content of the mixture is absorbed by the absorption solution and the inert gas leaves the top tube of the absorber A comparatively free of ammonia vapor and is returned to the circulating fan F through the suction conduit 31.

The outer passageway of the concentric tube evaporator E is connected by a conduit 35 to the header 36 of the cooling unit generally indicated by 37 which is positioned in the food storage compartment 16 of the cabinet 15 considerably above the apparatus compartment 17 in which the evaporator E is positioned. The lower header 38 of the cooling unit 37 is connected to the opposite end of the concentric tube evaporator E by conduit 39. In order to circulate the secondary cooling liquid through the outer passageway of the concentric tube evaporator E, the conduit 35, the cooling unit 37 and the conduit 39, a bleed conduit 40 leads from the discharge conduit 26 of the circulating fan F to the upwardly extending portion of the conduit 35. The liquid level in the secondary heat transfer circuit which comprises the outer passageway of the concentric tube evaporator E, conduit 35, cooling unit 37 and conduit 39 is above the point of connection between the conduits 40 and 35 so that the inert gas under pressure flowing through the conduit 40 will form alternate slugs of inert gas and the secondary heat transfer liquid in the upwardly extending conduit 35 above its point of connection with the conduit 40 and positively circulate the secondary heat transfer liquid. The inert gas which enters the header 36 of the cooling unit 37 is separated from the liquid in the header 36 and is returned to the suction conduit 31 of the circulating fan F by conduit 41.

The horizontal portions of the conduits 35, 39, 40, and 41 are preferably embedded in the bottom insulated wall 42 of the food storage compartment 16 and their vertically extending portions above the horizontal portions are embedded in the back insulated wall 43 of the food storage compartment. The evaporator E and the conduits 35 and 39 leading downwardly from the bottom wall 42 of the food storage compartment are also embedded in insulation. If desired the gas heat exchanger 32 may also be embedded in insulation. This insulation has not been shown in the drawings so that the location of the conduits of the apparatus could be more clearly shown. The portions of the insulated walls 42 and 43 in which the conduits 35, 39, 40 and 41 are embedded, are preferably removable from the remainder of the walls, as shown, to form a removable closure carried by the conduits 35, 39, 40 and 41 so that the entire apparatus can be removed rearwardly from the cabinet as a unit.

Headers 36 and 38 of the cooling unit 37 are preferably connected by a plurality of conduits 44 which form a support for a housing 45 to receive ice trays.

The lower tube of the condenser C is connected to the suction conduit 31 of the circulator fan F by a vent conduit 46 and the solution reservoir S is connected to the conduit 46 by a vent conduit 47 so that any inert gas finding its way into these vessels will be returned to the inert gas circuit.

The fan 10 which is driven by the motor M which also drives the circulator fan F through a magnetic transmission to be described hereinafter is positioned to circulate cooling air from the bottom and front of the apparatus compartment backwardly over the absorber A and the condenser C and the cooling air will exit through the louvers 18 in the back of the apparatus compartment. The tube 12 which forms the products of combustion flue and extends through the boiler 11 has a flat extension 48 which extends upwardly along the rear wall 43 of the cabinet 15 so as to carry away the products of combustion to the upper portion of the cabinet and yet have the cabinet capable of being positioned closely against a wall.

Figure 2:
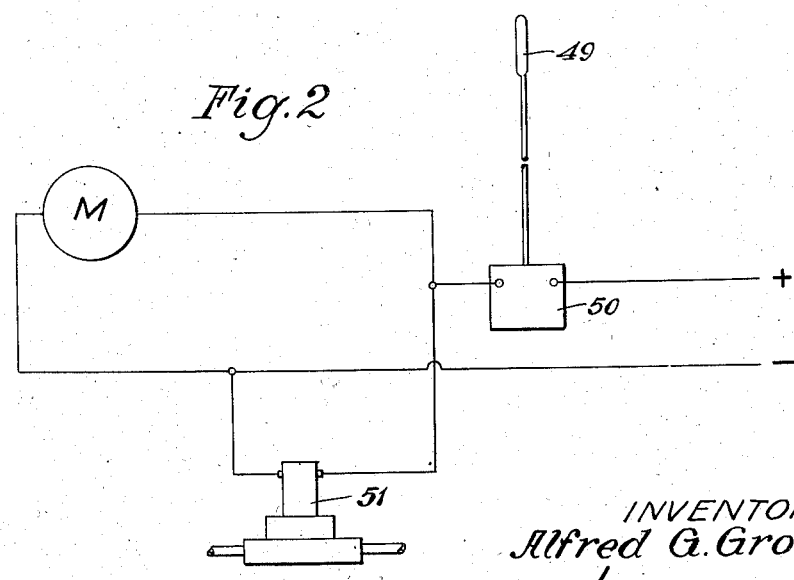
Figure 2 shows the control circuit for the apparatus according to this invention.

The supply of energy to the motor and the supply of gas to the burner for heating the boiler 11 may be controlled responsive to the cooling unit 37 or to the temperature of the food storage compartment 16 by a circuit such as shown in Figure 2 of the drawings. The control includes a thermostatic bulb 49, which may be positioned in contact with the cooling unit 37 or positioned in the interior of the food storage compartment 16, connected to a control device 50 which may be a control such as shown and described in the patent to Coons, 2,228,343, granted January 14, 1941, or any other suitable control.

As shown in Figure 2 one side of the power line is connected directly to the motor M and to a magnetic valve 51 in the gas line supplying combustible gas to the burner for the boiler 11 while the other side of the power line is connected to those elements through the intermediary of the control device 50 so that the supply of electricity to the motor M and gas to the burner for the boiler 11 is intermittently supplied and cut off responsive to the temperature of the cooling element 37 or the food storage compartment 16 depending upon where the bulb 49 is positioned.

Figure 3:
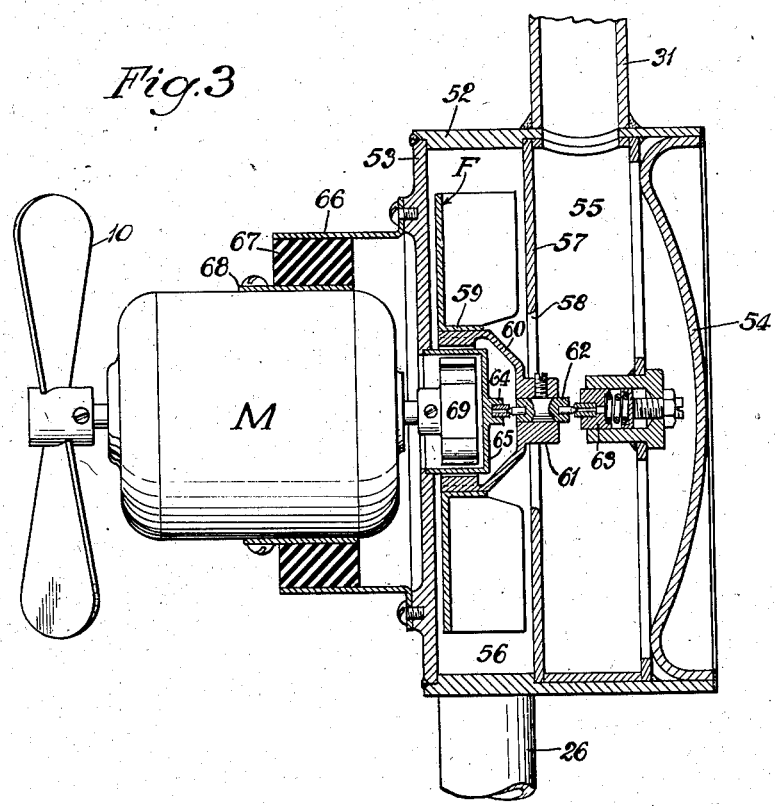
Figure 3 shows the construction of the power unit for circulating the mediums and driving the cooling fan.

Figure 3 shows the construction of the circulating fan F, the motor M and the magnetic transmission for transmitting power from the motor M to the fan F located on the interior walls of the inert gas circuit. The fan F is housed in a housing 52 connected to the suction and discharge conduits 31 and 26, respectively, forming a part of the inert gas circuit, and has end closures 53 and 54. The interior of the housing 52 is divided into a suction chamber 55 and a pressure chamber 56 by a partition 57 having an opening 58 leading to the eye of the fan. The hub 59 of the fan is pressed tightly over the exterior of a cylindrical permanent magnet 60 having a plurality of poles on its inner face and a hub 61 connected to a shaft 62 mounted for rotation on bearing assemblies 63 and 64 on the interior of the casing 52. Secured to the end closure 53 is an inwardly extending cup shaped member 65 which extends closely adjacent to the poles of the permanent magnet 60, the inner end of which supports the bearing assembly 64. The cup-shaped member 65 is made of non-magnetic material.

Secured to the outer face of the end closure 53 is an annular ring 66 which supports the motor M through the intermediary of a rubber ring 67 bonded by vulcanization to the inner periphery of the ring 66 and to the outer periphery of a ring 68 secured to the periphery of the motor M. One end of the motor shaft carries the air circulating fan 10 while the opposite end carries a second permanent magnet 69 which extends into the interior of the non-magnetic cup-shaped member 65 to closely adjacent the permanent magnet 60. The permanent magnet 69 has the same number of poles on its exterior periphery as the permanent magnet has on its interior periphery so that when the motor is energized and its shaft rotated the magnet 60 and the fan F will be rotated by magnetic attraction to the magnet 69.

While in Figure 1 the suction conduit 31 is shown as leading through the end closure of the fan F, in actual practice it would be made as shown in Figure 3, the arrangement of Figure 1 being shown merely for the purpose of clarity of illustration.

From the foregoing it can be seen that this invention provides an absorption refrigerating apparatus in which all of the operating parts can be housed in the apparatus compartment beneath the food storage compartment of a domestic refrigerator and having a mechanical circulator for circulating the refrigerant, the inert gas and the absorption solution in the refrigeration apparatus proper, in which an indirect heat transfer liquid in heat transfer relationship with the evaporator positioned in the apparatus compartment is also circulated by the circulator unit through a secondary heat transfer circuit including the cooling unit positioned in the food storage compartment, and in which the supply of energy to the circulator unit and the fuel to the boiler is simultaneously energized responsive to the temperature of the cooling unit, or that of the food storage compartment, so that all the mediums in the refrigerating system proper and the secondary heat transfer liquid will be circulated simultaneously with the application of heat to the boiler.

While I have shown but a single embodiment of my invention it is to be understood that this embodiment is to be taken as illustrative only and not in a limiting sense. I do not wish to be limited to the particular structure shown and described but to include all equivalent variations thereof except as limited by the scope of the claims.

I claim:

1. An absorption refrigerating apparatus comprising an inert gas circuit including an evaporator and an absorber, means for producing a pressure difference in said inert gas circuit, a secondary heat transfer liquid in heat exchange with said evaporator, a cooling unit positioned above said evaporator, and means utilizing the pressure difference in said inert gas circuit for raising said secondary heat transfer liquid into said cooling unit.

2. An absorption refrigerating apparatus comprising an inert gas circuit including an evaporator and an absorber, means for producing a pressure difference in said inert gas circuit, a secondary heat transfer liquid in heat exchange with said evaporator, a cooling unit positioned at a level above said evaporator, and means including a gas lift pump for utilizing the pressure difference in said inert gas circuit for raising said secondary heat transfer liquid into said cooling unit.

3. An absorption refrigerating apparatus comprising an inert gas circuit including an evaporator and an absorber, means for producing a pressure difference in said inert gas circuit, a secondary heat transfer fluid in heat exchange with said evaporator, a cooling unit positioned at a level above said evaporator, means including a gas lift pump for utilizing the pressure difference in said inert gas circuit for raising said secondary heat transfer liquid into the said cooling unit, and means for venting said cooling unit to said inert gas circuit.

4. A refrigerating apparatus comprising an inert gas circuit including an evaporator and an absorber, a secondary heat transfer circuit including a cooling unit and an element surrounding and in heat transfer relationship with said evaporator, means for placing said inert gas under pressure in said inert gas circuit, and means for utilizing a portion of said inert gas placed under pressure for circulating a secondary heat transfer fluid in said secondary heat transfer circuit.

5. A refrigerating apparatus comprising an inert gas circuit including an evaporator and an absorber, a secondary heat transfer circuit including a cooling unit and an element surrounding and in heat transfer relationship with said evaporator, means for placing said inert gas under pressure in said inert gas circuit, and means for utilizing a portion of said inert gas placed under pressure for circulating the secondary heat transfer fluid in said secondary heat transfer circuit, said last mentioned means including a gas lift pump.

6. A refrigerating apparatus comprising an inert gas circuit including an evaporator and an absorber, a secondary heat transfer circuit including a cooling unit and an element surrounding and in heat transfer relationship with said evaporator, means for placing said inert gas under pressure in said inert gas circuit, means for utilizing a portion of said inert gas placed under pressure for circulating the secondary heat transfer fluid in said secondary heat transfer circuit, and means for returning the inert gas to said inert gas circuit.

7. A refrigerating apparatus comprising an inert gas circuit including an evaporator and an absorber, a fan in said inert gas circuit for circulating an inert gas, a secondary heat transfer circuit including an element surrounding and in heat transfer with said evaporator and a cooling unit positioned above said evaporator, a conduit leading from the pressure side of said fan to said circuit below the liquid level therein for leading inert gas to said secondary circuit for circulating a heat transfer fluid therein.

8. In combination, a domestic refrigerator cabinet having an upper food storage compartment and a lower apparatus compartment, an inert gas circuit including an evaporator and an absorber positioned in said apparatus compartment, a cooling unit positioned in said food storage compartment, a heat transfer element in heat exchange with said evaporator in said apparatus compartment and means for utilizing the pressure difference in said inert gas circuit for raising a secondary heat transfer liquid from said heat transfer element into said cooling unit.

9. In combination, a domestic refrigerator cabinet having an upper food storage compartment and a lower apparatus compartment, a refrigerating apparatus associated with said cabinet having an inert gas circuit means for producing a pressure difference in said inert gas circuit, a cooling unit in said food storage compartment, a heat transfer element in heat exchange with said evaporator in said apparatus compartment, means for utilizing the pressure difference in said inert gas for raising a heat transfer fluid from said heat transfer element to said cooling unit.

10. In combination, a domestic refrigerator cabinet having an apparatus compartment and a food storage compartment, an air-cooled absorption refrigerating apparatus associated therewith, said apparatus including a vertically extending air-cooled condenser positioned adjacent the rear wall of said apparatus compartment, a solution circuit in said apparatus compartment including a generator and a vertically extending absorber positioned immediately in front of said condenser, an inert gas circuit including said absorber and an evaporator, a fan in said inert gas circuit for circulating the inert gas therein, a motor positioned exteriorly of said inert gas circuit in said apparatus compartment, a magnetic transmission for transmitting motion from said motor to said fan through the walls of said inert gas circuit, an air circulating fan positioned in said apparatus compartment in front of said condenser and absorber to circulate cooling air thereover and being driven by said motor.

11. In combination, a domestic refrigerator cabinet having an apparatus compartment and a food storage compartment, an air-cooled absorption refrigerating apparatus associated therewith, said apparatus including a vertically extending air-cooled condenser positioned adjacent the rear wall of said apparatus compartment, a solution circuit in said apparatus compartment including a generator and a vertically extending absorber positioned immediately in front of said condenser, an inert gas circuit in said apparatus compartment including said absorber and an evaporator, a fan in said inert gas circuit for circulating an inert gas therein, a motor positioned exteriorly of said inert gas circuit in said apparatus compartment, a magnetic transmission for transmitting motion from said motor to said fan through the walls of said inert gas circuit, an air circulating fan positioned in said apparatus compartment in front of said condenser and absorber to circulate cooling air thereover and being driven by said motor, a cooling unit in said food storage compartment and means for transferring heat from said cooling unit to said evaporator.

12. An absorption refrigerating apparatus comprising an inert gas circuit including an evaporator and an absorber, a solution circuit including said absorber and a generator, a condenser, means for leading liquid refrigerant from said condenser to said evaporator, a secondary heat transfer circuit including a cooling unit positioned above said evaporator and a heat exchange element in heat exchange with said evaporator and means for circulating an inert gas in said inert gas circuit between said evaporator and said absorber, for circulating an absorption solution in said solution circuit between said absorber and said generator, for circulating the refrigerant through said evaporator and for circulating a heat transfer liquid in said heat transfer circuit between said heat exchange element and said cooling unit.

13. A refrigerating apparatus comprising an inert gas circuit including an evaporator, a secondary heat transfer circuit including a cooling unit and a heat exchange element in heat exchange with said evaporator, means for creating a pressure difference in said inert gas circuit, and means for utilizing a portion only of said inert gas at its raised pressure for circulating a heat transfer liquid from said heat exchange element to said cooling unit.

14. In combination, a domestic refrigerator cabinet having an upper food storage compartment and a lower apparatus compartment, a refrigerating apparatus associated with said cabinet comprising an inert gas circuit including an evaporator positioned in said apparatus compartment below said food storage compartment, a secondary heat transfer circuit including a cooling unit positioned in said food storage compartment and a heat exchange element in heat exchange with said evaporator in said apparatus compartment, and means in said inert gas circuit for circulating an inert gas therein and for circulating a heat transfer fluid in said heat transfer circuit from said heat exchange element to said cooling unit and back to said heat exchange element.

15. In combination, a domestic refrigerator cabinet having an upper food storage compartment and a lower apparatus compartment, a refrigerating apparatus associated with said cabinet comprising an inert gas circuit including an evaporator positioned in said apparatus compartment below said food storage compartment, a secondary heat transfer circuit including a cooling unit positioned in said food storage compartment and a heat exchange element in heat exchange with said evaporator in said apparatus compartment, a fan in said inert gas circuit for circulating an inert gas therein and for supplying inert gas to said heat transfer circuit for circulating the heat transfer liquid from said heat exchange element to said cooling unit.

16. In combination, a domestic refrigerator cabinet having an upper food storage compartment and a lower apparatus compartment, a refrigerating apparatus associated with said cabinet comprising an inert gas circuit including an evaporator positioned in said apparatus compartment below said food storage compartment, secondary heat transfer circuit including a cooling unit positioned in said food storage compartment and a heat exchange element in heat exchange with said evaporator in said apparatus compartment, a fan in said inert gas circuit for circulating an inert gas therein and for supplying inert gas in said heat transfer circuit for circulating a heat transfer liquid from said heat exchange element to said cooling unit and means for returning the inert gas supplied to said heat transfer circuit to said inert gas circuit.

17. A refrigerating apparatus comprising an inert gas circuit including an evaporator, a secondary heat transfer circuit including a cooling unit and a heat exchange element in heat exchange with said evaporator, means for creating a pressure difference in said inert gas circuit, means for utilizing only a portion of the inert gas at its raised pressure for circulating the heat transfer liquid from said heat exchange element to said cooling unit and means for returning the inert gas utilized in said heat transfer circuit to said inert gas circuit.

18. An absorption refrigerating apparatus comprising, an inert gas circuit including an evaporator and an absorber, a solution circuit including said absorber and a generator, a condenser, means for leading condensed refrigerant from said condenser to said evaporator, a secondary heat transfer circuit including a cooling unit positioned above said evaporator and a heat exchange element in heat exchange with said evaporator, motor-driven means for circulating the inert gas between said evaporator and absorber, for circulating an absorption solution between said generator and said absorber, for circulating liquid refrigerant through said evaporator and for circulating a heat transfer fluid in said heat transfer circuit between said heat transfer element and said cooling unit, and means for controlling said motor-driven means responsive to the demand for refrigeration whereby the circulation of inert gas, solution, refrigerant and heat transfer fluid simultaneously starts and stops responsive to refrigeration demand.

19. A refrigerating apparatus comprising an inert gas circuit including an evaporator, a secondary heat transfer circuit including a cooling unit and a heat exchange element in heat exchange with said evaporator, means for creating a pressure differential in said inert gas circuit, means for utilizing a portion only of the inert gas at its raised pressure for circulating the heat transfer liquid from said heat exchange element to said cooling unit, and means for controlling the operation of said pressure-differential-creating means responsive to refrigeration demand to simultaneously start and stop circulation of inert gas and heat transfer liquid.

ALFRED G. GROSS.